(12) United States Patent
Thornberg et al.

(10) Patent No.: US 11,977,397 B2
(45) Date of Patent: May 7, 2024

(54) MISSION-ADAPTABLE PROCEDURES FOR AIRCRAFT

(71) Applicant: LOCKHEED MARTIN CORPORATION, Bethesda, MD (US)

(72) Inventors: Christopher A. Thornberg, Newtown, CT (US); Anthony J. Smith, Trumbull, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 182 days.

(21) Appl. No.: 17/367,931

(22) Filed: Jul. 6, 2021

(65) Prior Publication Data
US 2023/0012184 A1 Jan. 12, 2023

(51) Int. Cl.
*B64D 45/00* (2006.01)
*G05D 1/00* (2006.01)

(52) U.S. Cl.
CPC ............. *G05D 1/106* (2019.05); *B64D 45/00* (2013.01); *B64D 2045/0085* (2013.01)

(58) Field of Classification Search
CPC . G05D 1/106; B64D 45/00; B64D 2045/0085
See application file for complete search history.

(56) References Cited

U.S. PATENT DOCUMENTS

| 6,175,803 | B1* | 1/2001 | Chowanic ............... G01C 21/34 701/25 |
| 7,512,462 | B2 | 3/2009 | Nichols et al. |
| 8,285,425 | B2 | 10/2012 | Morales de la Rica et al. |
| 8,521,340 | B2 | 8/2013 | Coulmeau |
| 9,688,403 | B2 | 6/2017 | Winn et al. |
| 10,921,826 | B2 | 2/2021 | Groden et al. |
| 2016/0140852 | A1* | 5/2016 | Downey ................... G07C 5/02 701/14 |
| 2019/0033861 | A1* | 1/2019 | Groden ................... G05D 1/106 |

* cited by examiner

*Primary Examiner* — Vivek D Koppikar
*Assistant Examiner* — Jeffrey R Chalhoub
(74) *Attorney, Agent, or Firm* — Foley & Lardner LLP (57) ABSTRACT

Systems and methods for mission-based path modifications are presented herein. One or more processors may be coupled with memory and housed in a vehicle. The one or more processors may receive data indicative of an issue with at least one function of the vehicle during a mission defined by a type of cargo and a flight path comprising a plurality of segments. The one or more processors may determine, responsive to the issue with the at least one function, an action to perform for the vehicle based on the issue, a current segment of the plurality of segments, and the mission. The one or more processors may execute, during the current segment or a subsequent segment of the plurality of segments, the action on the vehicle.

20 Claims, 4 Drawing Sheets

MISSION-ADAPTABLE PROCEDURES FOR AIRCRAFT

TECHNICAL FIELD

This disclosure generally relates to aircraft control, and in particular to modifying flight paths in accordance with mission-specific parameters.

BACKGROUND

An air vehicle may navigate through an environment along a flight path from a start point to an end point. Due to unforeseen circumstances, there may be cases in which the air vehicle may deviate from the flight path.

SUMMARY

A control system of an air vehicle may trigger indication prompting pilots to make precautionary emergency procedures in the presence of failures that reduce redundancy while still maintaining full aircraft control. The onboard pilots may determine the optimum course of action in real time based on their own understanding of the missions objectives, rules, and priorities. This approach may be appropriate from a safety perspective when the flight includes onboard personnel as personal safety may be paramount. Such approaches, however, may not be as suitable for unmanned air vehicles, because such vehicles often conduct operations over uninhabited terrains and personal safety may not be as large of a concern. In such scenarios, the decision whether to take a precautionary emergency landing versus taking a chance on continuing the mission with reduced redundancy may be based on other considerations.

In the context of unmanned piloting, having a human operator assigned to the air vehicle to monitor the vehicle operations and manually navigate the vehicle through the environment may be prohibitively impractical and costly. One approach in such contexts may be to configure the air vehicle with a fixed rule to react to the occurrence of failures. For example, the rule may specify that the air vehicle is to return to the start point or find an empty plot to land, upon detecting a fault at any point during the flight. There may be many issues with handling failures in accordance with this approach. For instance, the ideal decision on how best to respond to failures can vary from mission to mission and can even differ depending on which segment the air vehicle is in during the mission. Since the ideal response may vary based on the specifics of the mission and with operator's priorities, generic pre-defined responses may also be not ideal. Due to this variability, a fixed set of responses to failures may be sub-optimal especially from a cost-benefit analysis, and may thus be undesirable.

To address these and other technical challenges, an air vehicle may be configured with a flight plan that provides for the capability to optimize the response to failures based upon various factors. The flight path may be defined prior to the mission, and may be divided into multiple segments from a start point to an end point. Each mission segment may be then prescribed with a response in the event of a system failure to reduce redundancy in flight critical systems. The pre-defined aircraft responses can be further decomposed and individually assigned to certain classifications of failures to account for the predicted probability of the loss of the last tolerable level of redundancy in the determination of likelihood of mission success. The flight path for the mission may also define the set of criteria to re-plan the route in response to a failure to achieve the optimized flight path. For example, the plan can specify that the air vehicle is to fly over uninhabited areas or minimize the time reach a way point or destination to limit the exposure time to the failure, thereby reducing the chance of another failure from occurring. The criteria may be customized for a particular mission, application, and operator, to take into account various considerations for all phases of the planned mission.

By defining the flight plan in this manner, the flexibility and capability can allow operators of air vehicles to optimize the navigation and responses of their air vehicles based on the assessments unique to each mission. The pre-planned flight plan may apply to manned and unmanned settings in terms of the piloting of the aircraft. In unmanned contexts, the air vehicle can automatically determine and take optimal countermeasures in response to failures without human feedback. In manned contexts, the air vehicle control systems can present an indication or prompt listing a set of optimal countermeasures from which to select upon the occurrence of the failure. In either scenario, the response to the failure can be optimal in accordance with the specifications of the flight mission.

Aspects of the present disclosure are directed to systems and methods for mission-based path modifications. One or more processors may be coupled with memory and housed in a vehicle. The one or more processors may receive data indicative of an issue with at least one function of the vehicle during a mission defined by a type of cargo and a flight path comprising a plurality of segments. The one or more processors may determine, responsive to the issue with the at least one function, an action to perform for the vehicle based on the issue, a current segment of the plurality of segments, and the mission. The one or more processors may execute, during the current segment or a subsequent segment of the plurality of segments, the action on the vehicle.

In some embodiments, the one or more processors may determine, in accordance with a weight composition specified for the mission, a score based on the issue. The one or more processors may identify a threshold for a current segment of the plurality of segments of the mission. The one or more processors may execute, during the current segment or a subsequent segment of the plurality of segments, the action on the vehicle based on a comparison of the score with the threshold for the current segment of the mission.

In some embodiments, the one or more processors may maintain a flight plan for the mission defining: (i) the plurality of segments for the flight path, (ii) the weight composition with which to determine the score, (iii) the threshold for the score, and (iv) the action to perform based on the comparison. In some embodiments, the one or more processors may receive the flight plan from a second computing device, the second computing device presenting an interface operable to define the flight plan In some embodiments, the flight plan may define, for each segment: (i) an initial point and a terminal point, (ii) the weight composition with which to determine a plurality of weights for a corresponding plurality of issues, (iii) a plurality of thresholds for a corresponding plurality of actions, and (iv) the plurality of actions to perform in response to the score based on the plurality of weights satisfying one or more of the plurality of thresholds.

In some embodiments, the one or more processors may determine that the score does not satisfy the threshold for the current segment. In some embodiments, the one or more processors may identify, in response to determining that the score does not satisfy the threshold, the action to maintain the flight path of the vehicle along the current segment.

In some embodiments, the one or more processors may determine that the score satisfies the threshold for the current segment. In some embodiments, the one or more processors may select, based on the score determined to satisfy the threshold, the action from a plurality of actions to modify the flight path of the vehicle.

In some embodiments, the one or more processors may determine that the score satisfies the threshold for the current segment. In some embodiments, the one or more processors may provide, responsive to determining that the score satisfies the threshold, instructions to present a plurality of actions from which to select for modifying the flight path.

In some embodiments, the one or more processors may determine, in accordance with the weight composition for the mission, a combined score based on a plurality of weights. Each of the plurality of weights may correspond to a respective issue of the vehicle during the mission. In some embodiments, the one or more processors may perform the action on the vehicle in navigating the flight path in accordance with the mission based on a comparison of the combined score with the threshold for the current segment of the mission.

In some embodiments, the one or more processors may determine the score based on at least one of: a classification of the issue of the function, a measurement from an instrumentation of the vehicle, the type of cargo in the vehicle, an objective for the mission, a characteristic of a terrain, a number of occupants in the vehicle, a time elapsed on the flight path, or a vehicle type of the vehicle. In some embodiments, the one or more processors may identify, from a plurality of thresholds for a corresponding plurality of segments, the threshold for the current segment. In some embodiments, the one or more processors may identify, from a plurality of issues, the issue with which to determine the action based on a plurality of priorities for the plurality of issues.

DETAILED DESCRIPTION

In the following detailed description, reference is made to the accompanying drawings, which form a part hereof. In the drawings, similar symbols typically identify similar components, unless context indicates otherwise.

Figure 1:
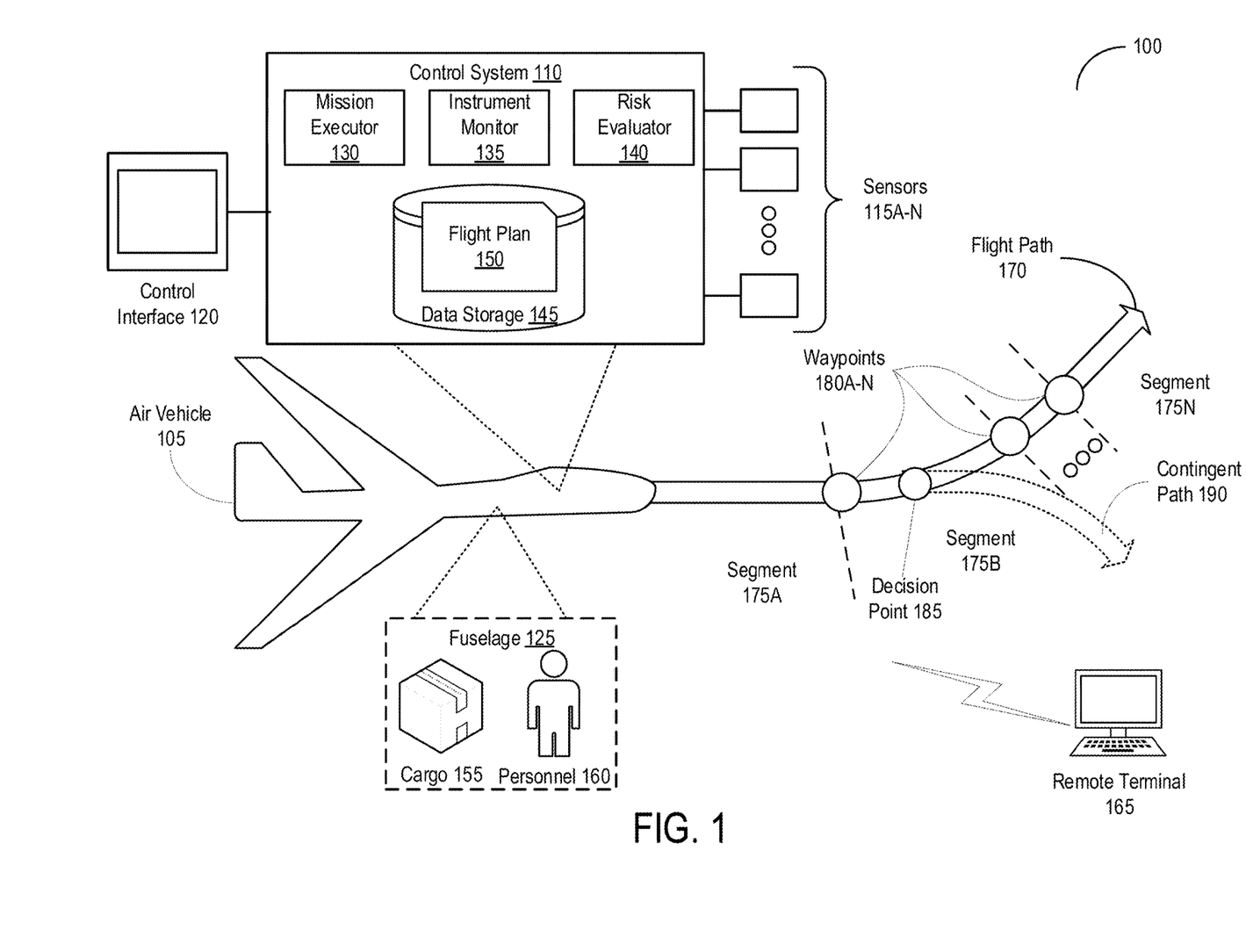
FIG. 1 depicts a block diagram of an example system for modifying flight paths based on mission specifications in accordance with an illustrative embodiment.

Referring now to FIG. 1, depicted is a block diagram of an environment or a system 100 for modifying flight paths based on mission specifications. In overview, the system 100 may include at least one air vehicle 105. The air vehicle 105 may include at least one control system 110, one or more sensors 115A-N (hereinafter generally referred to as sensors 115), at least one control interface 120, and at least one fuselage 125. The control system 110, the sensors 115, and the control interface 120 can be communicatively coupled with one another and other components (not depicted) in the air vehicle 105. The control system 110 may include at least one mission executor 130, at least on instrument monitor 135, at least one risk evaluator 140, and at least one data storage 145. The data storage 145 may store, maintain, or otherwise include at least one flight plan 150 (sometimes herein referred to as a mission plan). The fuselage 125 may include cargo 155 or personnel 160, or any combination thereof. In some embodiments, the system 100 may also include at least one remote terminal 165. Various components of the system 100, such as the control system 110, the sensors 115, the control interface 120, and the remote terminal 160, may be implemented using hardware components or a combination of software and hardware components as detailed herein in Section B.

In further detail, the air vehicle 105 can be any transport capable of navigating through the environment and carrying the cargo 155 or personnel 160, or both, in the fuselage 125 therein. The air vehicle 105 can be any type of aircraft, such as a fixed-wing aircraft (e.g., with a propeller or jet engine), a rotorcraft (e.g., a helicopter, an autogyro, or a gyrodone), or an aerostat (e.g., an airship or dirigible), among others. The air vehicle 105 can be manned or unmanned, or any combination thereof. If manned, the navigation of the air vehicle 105 can be controlled by an onboard pilot from the cockpit therein. If unmanned, the navigation of the air vehicle 105 can be autonomous with no input or remote input (e.g., from the remote terminal 165) while traveling through the environment. While discussed primarily in terms of an air vehicle, land-bound vehicles (e.g., a sedan car, a truck, a van, or a bus) and seaborne vehicles (e.g., a ship, a frigate, or a hydrofoil ship) may be also applicable.

The mission executor 130 of the control system 110 can maintain the flight plan 150 on the data storage 145. The flight plan 150 can be maintained and stored on the data storage 145 using at least one data structure, such as a table, an array, a matrix, a linked list, a tree, a graph, and a heap, among others. The flight plan 150 can also specify, identify, or define various parameters of a mission to be undertaken by the air vehicle 105. The parameters for the mission defined by the flight plan 150 can include an objective of the mission, a type of cargo to be carried, an occupancy of personnel 160 in the air vehicle 105, a type of air vehicle 105, among others. The objective of the mission can include, for example, cargo ferrying, passenger transport, aerial refueling, aerial firefighting, or surveillance, among others. The type of cargo can identify items and one or more characteristics of the cargo 155 to be carried by the air vehicle 105. The occupancy can identify whether the air vehicle 105 is to carry personnel 160 and the number of personnel 160, among others. The type of air vehicle 105 can identify a category for the air vehicle 105, such as fixed-wing or rotor-based, among others.

In addition, the flight plan 150 can define at least one flight path 170 for the mission to be carried out by the air vehicle 105. The flight plan 150 may identify an initial point to an end point for the flight path 170, as well as the route between the initial point and the end point. The points may be defined, for example, in terms of geographic coordinates (e.g., longitudes and latitudes) and altitude among others. The route for the flight plan 150 can also be defined in terms of geographic coordinates, angle, and altitude. The flight path 170 can be divided or can include one or more segments 175A-N (hereinafter generally referred to as segments 175) as defined by the flight plan 150. Each segment 175 can correspond to a respective portion of the flight path 170 defined by one or more waypoints 180A-N (hereinafter generally referred to as waypoints 180). The flight plan 150 can define an initial waypoint and a terminal waypoint (examples of waypoints 180) for each segment 175. The points may be defined, for example, in terms of geographic coordinates (e.g., longitudes and latitudes) and altitude, among others. The flight plan 150 can specify a route between the initial point and the terminal point using a straight or curved path, or any combination thereof. In some embodiments, at least one segment 175 can define one or more decision points 185 at which the control system 110 is to determine whether to execute any action with respect to the air vehicle 105 navigating through the environment. The decision point 185 may be between waypoints 180 defining a single segment 175 (e.g., as depicted). The decision point 185 may correspond to one of the waypoints 180.

The flight plan 150 can further define a weight composition for determining a risk score based on issues with functions on the air vehicle 105 during the mission. The weight composition may be used to deal with single or multiple failures that can reduce the chance of flight mission success. The weight composition can specify, identify, or define a set of weights to contribute to the determination of the risk score. For example, the weight composition may be a model or function maintained using a data structure, in which the inputs to the composition may include issues with functions in the air vehicle 105 and the output may be at least one risk score. The weight composition can be defined to account for the various parameters of the mission, such as the objective of the mission, the type of cargo 155 to be carried, and the occupancy of personnel 160 in the air vehicle 105 as discussed above, and data from the various sensors 115. In general, when the overall combined risk score crosses a threshold, the control system 110 may take action on the air vehicle 105 the navigating through the environment.

In some embodiments, the flight plan 150 can specify a separate weight composition for each segment 175 in the flight path 170. Under the flight plan 150, the weight composition for one segment 175 can differ from the weight composition for another segment 175. The difference in the weight compositions can take into account the impact or significance of various issues at different segments 175 in the flight path 170. In the weight composition, each weight can be numeric value (e.g., multiplicative factor) and correspond to an issue with a respective function the air vehicle 105. The function of the air vehicle 105 can correspond to various individual components in the air vehicle 105, such as a structure (including hull, fuselage, cockpit, windows, tail boom, and masts), landing gear, engine, rotor (including main rotor and tail rotor), wing (including slat, flat, spoiler, and aileron), and tail (including stabilizers, elevator, and rudder), among others. The issue may correspond to various types of failure related to any of these components. In some embodiments, the issue may indicate a severity of the failure (e.g., low, medium, or high) in the corresponding component.

Furthermore, the flight plan 150 can identify or define one or more thresholds with which the risk score is to be compared against and one or more actions to be performed based on the comparison. The threshold can delineate, identify, or otherwise define a value for the risk score at which the air vehicle 105 is to perform a specific action or maintain the current state of the air vehicle 105. With multiple thresholds, each threshold can define the value for the risk score at which the air vehicle 105 is to perform the action when the threshold is satisfied. The action to be taken by the air vehicle 105 when the respective threshold is satisfied can include, for example, performing an emergency procedure, navigating to an emergency landing zone along, returning to the start point for the flight path 170, changing power parameters (e.g., thrust or shaft power) for engines, and altering altitude, among others. In some embodiments, the flight plan 150 can specify one or more thresholds and actions to be taken for the respective threshold for each segment 175 along the flight path 170. The thresholds and the corresponding actions to be taken in one segment 175 can differ the thresholds and corresponding actions to be taken in another segment 175.

For each decision point 185 along the flight path 170, the flight plan 150 can identify or define the action to be taken by the air vehicle 105. The flight plan 150 can define the action to be taken based on one or more types of failure detected on the air vehicle 105. In some embodiments, at least one type of failure can corresponding to a combination of other types of failures detected on the air vehicle 105. For example, one type of failure can include fuel leak and engine failure. In some embodiments, the definition of the action can be independent of the risk score satisfying the threshold. The definition of the action by the flight plan 150 can be further based on a priority of the types of failures detection of the air vehicle 105. The priority may identify a precedence for the corresponding type of failure on to be accounted for with respect to determining which action is to be taken by the air vehicle 105. For example, using a table, the flight plan 150 can define that the failure to the hull structure as having lower priority than the failure to an engine. In this way, the action to be taken to address the failure to the engine can take precedence over the action to be taken to address a hull failure. In some embodiments, the action to be taken at the decision point 185 can be dependent on the risk score representing the overall combination of the failures satisfying the threshold.

In some embodiments, the flight plan 150 can define at least one contingent path 190 as one of the actions that the air vehicle 105 is to take. In some embodiments, the contingent path 190 may be defined relative to one of the decision points 185 along the flight path 170. The flight plan 150 can define specifications for the landing zone and the route for the contingent path 190. For example, the flight plan 150 can specify that the air vehicle 105 is to be navigated to a maintenance facility via the contingent path 190 starting from the decision point 185, upon detecting a failure with a propeller. In some embodiments, the contingent path 190 may be defined independently of the decision points 185 along the flight path 170. For example, the flight plan 150 can specify that the air vehicle 105 is to return to the initial point, when the combined risk score satisfies the threshold.

Depending on the mission parameters and various other factors, the flight plan 150 can be configured to specify a variety of actions to take. For example, for an unmanned firefighting helicopter, the flight plan 150 can specify that precautionary emergency landings are not allowed in areas within the fire hazard zone. For an unmanned aircraft ferry over uninhabited and rugged terrain or water, the flight plan 150 can indicate that after a certain mission point to continue on with the mission in the presences of failures that significantly reduce air worthiness redundancy. The flight plan 150 can further specify that the aircraft is not to then land in terrain where aircraft recovery is ultimately unlikely from a practical perspective. This planning may take into consideration that it may be considered more beneficial to at least try and recover the aircraft by finishing the planned mission before the last level of airworthiness redundancy is lost. Furthermore, for unpiloted passenger transport, the flight plan 150 can list a set of precautionary emergency responses to optimize the safety of the passengers by landing at the first acceptable location.

The flight plan 150 can be defined or configured by an operator or a service of the air vehicle 105 prior to the mission. In some embodiments, the mission executor 130 can retrieve, identify, or receive the flight plan 150 from the remote terminal 165. The receipt of the flight plan 150 can be prior to the mission carried out by the air vehicle 105. The remote terminal 165 can display, render, or otherwise present an interface to permit a user to define and generate the flight plan 150. For example, a flight pre-planner application running on the remote terminal 165 can display a graphical user interface (GUI). Using the GUI presented on the remote terminal 165, the user may define the overall mission including the parameters for the mission. The user may also define flight path 170 and the individual segments 175, waypoints 180, decision points 185, or contingent path 190 therein, as well as thresholds for the risk score and the actions to be taken by the air vehicle 105. In some embodiments, the flight path 170 including the individual segments 175, the waypoints 180, the decision points 185, and the contingent path 190 may be defined relative to a world model. The world model may include or identify an environment or terrain through which the air vehicle 105 is to navigate. Once generated, the remote terminal 165 can send, upload, or otherwise transmit the flight plan 150 to the control system 110 on the air vehicle 105. In some embodiments, the remote terminal 165 can also provide the world model with the flight plan 150 to the control system 110. Upon receipt, the mission executor 130 can store and maintain the flight plan 150 onto the data storage 145.

The mission executor 130 can navigate the air vehicle 105 in accordance with the flight plan 150. As part of the initiation the air vehicle 105, the mission executor 130 can access the data storage 145 to identify or retrieve the flight plan 150. With the retrieval, the mission executor 130 can parse the flight plan 150 to identify the contents therein, such as the parameters of the missions, the flight path 170, the segments 175, the thresholds, and actions, among others. To carry out the mission specified by the flight plan 150, the mission executor 130 can regulate, control, or otherwise configure various components of the air vehicle 105. For example, the mission executor 130 can control the propulsion components of the air vehicle 105 to lift off and navigate along the flight path 170 in accordance with the specifications of the flight path 150.

During the mission as the air vehicle 105 navigates, the instrument monitor 135 of the control system 110 can monitor for, retrieve, or otherwise receive data indicative of at least one issue with one or more functions in the air vehicle 105. The instrument monitor 135 can retrieve or receive the data acquired from sensors 115 (sometimes herein referred to as instruments) on the air vehicle 105. The sensors 115 can measure or acquire various characteristics about the functions of the air vehicle 105, including the navigation (e.g., geographic location, altitude, airspeed, vertical speed, direction, heading, or turn) and operational status (e.g., critical, failed, or normal), usage (e.g., on or off), or other metrics (e.g., fuel level or temperature) of the various components therein. The sensors 115 can be situated on various locations of the air vehicle 105, for example, proximate to the components therein. In addition, the sensors 115 can acquire various characteristic about the environment or terrain through which the air vehicle 105 is navigating, such as whether the terrain is populated or unpopulated, mountainous, level or plane, includes a body of water (e.g., rivers, lake, sea, or ocean), and climate (e.g., temperate, jungle, or desert), among others. The acquired characteristics regarding the environment or terrain may be used by the control system 110 to determine or confirm a location of the air vehicle 105 within a world model defined in the data storage 145. Upon acquisition, the sensor 115 can relay, convey, or otherwise send the data to the instrument monitor 135.

From the data acquired from the sensors 115, the instrument monitor 135 can determine whether the data is indicative of the issue with the functions on board the air vehicle 105. In some embodiments, the data itself may indicate a failure and a severity of the vehicle of a component within the air vehicle 105. Upon receipt of the data, the instrument monitor 135 can determine that the data is indicative of the issue with the associated function. In some embodiments, the data may be further processed in accordance with a condition to determine whether the data is indicative of the failure. The condition can be specific to a function (e.g., component) measured by the sensor 115. The function may be a critical function to the operation of the air vehicle 105. Not all functions may be critical ones in the air vehicle 105, and critical functions may include those that result in loss of redundancy of various functions involved in vehicle control. The condition can define a set of values for the data deemed to be tolerable for the function and another set of values for the data deemed to correspond to an issue for the associated function. In some embodiments, the instruments 135 can identify a subset of data indicative of the issue with a critical function on the air vehicle 105.

With the receipt, the instrument monitor 135 can compare the acquired data to the condition for the sensor 115 to make the determination. When the data falls within the tolerable set of value, the instrument monitor 135 can determine that the data indicates that the associated function lacks any issues. The instrument monitor 135 can continue to monitor the data acquired from the sensors 115 for any issues or failures with various functions in the air vehicle 105. Otherwise, when the data is within the set of value deemed to be an issue, the instrument monitor 135 can determine that the data indicates an issue with the associated function. In some embodiments, the instrument monitor 135 can perform the comparison based on multiple sets of data from different sensors 115 in accordance with a set of rules for the sensors 115 in making the determination. The set of rules for the multiple data sets from different sensors 115 may define a combination of values from the data at which to determine that a critical failure has occurred. When the multiple sets of data do not match the values defined by the set of rules, the instrument monitor 135 can determine that the data indicates an issue with the associated functions. Conversely, when the multiple sets of data match the values defined by the set of rules, the instrument monitor 135 can determine that the data do not indicate an issue with the associated functions.

In response to detecting one or more issues, the risk evaluator 140 of the control system 110 can calculate, generate, or otherwise determine the risk score in accordance with the weight composition for the mission as defined by the flight plan 150. The risk score can indicate a likelihood of a failure of the mission undertaken by the air vehicle 105. In some embodiments, the risk score can represent an estimate of the cost-benefit analysis weighting the cost from potentially failing the objective of the mission with the benefits to various other factors. the risk evaluator 140 can identify the weight composition to use based on the current segment 175 in which the air vehicle 105 is located. The current segment 175 may be identified based on a geographic location of the air vehicle 105. For each issue with the associated function of the air vehicle 105, the risk evaluator 140 can identify or determine a weight for the issue based on the specification of the weight composition. Each weight can correspond to a respective issue of the associated function in the air vehicle 105. Based on the weights determined for the issues and the expected interactions from the issues, the risk evaluator 140 can determine a combined or aggregate risk score for the mission.

Additionally, depending on the specifications of the weight composition of the flight plan 150, the risk evaluator 140 can factor in other inputs in identify weights and determining the risk score. In some embodiments, the risk evaluator 140 can identify a classification of the issue of the function of the air vehicle 105 to input to the weight composition to determine a corresponding weight. The classification can include the severity of the issue (e.g., low, medium, or high) or a type of the function (e.g., structural, lift, steering, or other component) of the air vehicle 105. In some embodiments, the risk evaluator 140 can also identify the measurement data from the one or more sensors 115 to input to the weight composition to the identify the weight. For example, the risk evaluator 140 can input the temperature of a particular component as an input to the weight composition. In some embodiments, the risk evaluator 140 can identify the type of air vehicle 105 to input into the weight composition to determine the weight. For example, the risk evaluator 140 can identify the type of air vehicle 105 from the flight plan 150 or system configurations of the air vehicle 105, and use the type to input into the weight composition to identify the weight.

Continuing on, in some embodiments, the risk evaluator 140 can identify the type of cargo 155 as input to the weight composition. For example, the risk evaluator 140 can determine a higher weight for sensitive or fragile cargo, relative to commodity cargo. In some embodiments, the risk evaluator 140 can identify the objective of the mission as specified in the flight plan 150 as an input to the weight composition. For example, the risk evaluator 140 can read the flight plan 150 to determine that the objective is to carry cargo to the destination and input the objective as one of the inputs to the weight composition to determine the associated weight. In some embodiments, the risk evaluator 140 can identify a number of occupants (e.g., personnel 160) within the air vehicle 105 as an input to the weight composition. For instance, the risk evaluator 140 can use the sensors 115 within the fuselage 125 to determine the number of occupants or read from the specifications of the flight plan 150. The risk evaluator 140 can then input the number of occupants into the weight composition, with the generated weight proportionally varying with the number of occupants.

In some embodiments, the risk evaluator 140 can identify the characteristic of the terrain from the sensors 115 or map of the flight path 170 as another input to the weight composition. For example, the risk evaluator 140 can determine a higher weight when the terrain is identified as having an urbanized population versus when the terrain is identified as a body of water. In some embodiments, the risk evaluator 140 can identify a time elapsed on the flight along the flight path 170 to input into the weight composition. For instance, the risk evaluator 140 can maintain a timer to keep track of the amount of time elapsed since take off, and use the amount of time to identify the weight from the weight composition. Using these weights determined using other inputs, the risk evaluator 140 can determine the risk score in accordance with the weight composition.

With the determination, the risk evaluator 140 can compare the risk with the one or more thresholds specified by the flight plan 150. In conjunction, the risk evaluator 140 can select or identify the threshold with which to compare the risk score against in accordance with the flight plan 150. The threshold can be identified based on the current segment 175 of the flight path 170 in which the air vehicle 105 is located or navigating. Based on the comparison, the risk evaluator 140 can identify or select one or more actions to take as specified by the flight plan 150. If the risk score does not satisfy (e.g., is less than) any of the thresholds, the risk evaluator 140 can identify the action to maintain the flight path 170 along the current segment 175. The action to maintain the flight path 170 can be identified from the flight plan 150. The risk evaluator 140 can maintain the configurations of the components to navigate the flight path 170 as specified by the flight plan 150.

On the other hand, if the risk score satisfies (e.g., greater than or equal to) one of the thresholds, the risk evaluator 140 can select or identify the corresponding one or more actions that the air vehicle 105 is to take from the flight plan 150. The identified action can modify the flight path 170 that the air vehicle 105 is to take (e.g., taking the contingent path 190 from the decision point 185) on the current segment 175 or one of the subsequent segments 175. In some embodiments, the risk evaluator 140 can perform the identification upon approaching or reaching the decision point 185 along the flight path 170. In some embodiments, the risk evaluator 140 can identify the action as specified by the flight plan 150 for each threshold that the risk score satisfies. For instance, the risk evaluator 140 can select a set of actions based on the corresponding thresholds determined to be satisfied by the risk score.

In some embodiments, the risk evaluator 140 can identify the actions that the air vehicle 105 is to be taken from the flight plan 150, independent of the risk score. As discussed above, the flight plan 150 can identify the action to be taken based on one or more types of failure detected on the air vehicle 105 in accordance with a priority. For each type of failure detected, the risk evaluator 140 can identify the priority defined in the flight plan 150. The risk evaluator 140 can select the type of failure with the highest priority. The risk evaluator 140 can identify the action to be taken corresponding to the type of failure with the highest priority.

In some embodiments, the risk evaluator 140 can provide instructions to present the actions identified from the flight plan 150. The instructions can be provided to the control interface 120 in the air vehicle 105, the remote terminal 165, or another computing device for controlling the operations and navigation of the air vehicle 105. For example, the risk evaluator 140 can render the actions as potential countermeasures to take to address the detected issued of the function of the air vehicle 105 to an operator or pilot of the air vehicle 105. Upon presentation, the operator of the air vehicle 105 can select via an interface (e.g., using the control interface 120) one of the actions to take. The risk evaluator 140 can receive the action selected via the interface, and can identify the action as to be taken by the air vehicle 105.

Based on the comparison and identification of the action, the mission executor 130 can perform, carry out, or execute the action during the current segment 175 or one of the subsequent segments 175 according to the flight plan 150. When the action to maintain is selected, the mission executor 130 can continue with the configurations to navigate the air vehicle 105 along the flight path 170. When the action to modify the flight path 170 is selected, the mission can configure various components of the air vehicle 105 to perform the action as specified by the flight plan 150. In some embodiments, the mission executor 130 can identify a landing zone that satisfies the specifications of the contingent path 190 selected as the action to take. Upon identification, the mission executor 130 can adjust, change, or otherwise set the propulsion and navigation components to take the air vehicle 150 to the landing zone. The control system 105 can repeat the functionalities described above until the air vehicle 105 reaches the end of the flight path 150 or completes the mission as specified in the flight plan 150.

Configured with the flight plan 150, the control system 110 can provide flexibility and capability to the air vehicle 105 to optimize navigation and actions to take in response to issues with various functions on board the air vehicle 105. The navigation and the responses may also be tailored to the specifications of the mission. By optimizing navigation and action, the air vehicle 105 can reduce or lessen consumption of fuel in propelling the air vehicle 105, thereby improving efficiency. Furthermore, the air vehicle 105 may be prevented from taking cost or harm prohibitive actions, thereby increasing safety to the cargo 155 or the personnel 160 on the air vehicle 105.

Figure 2:
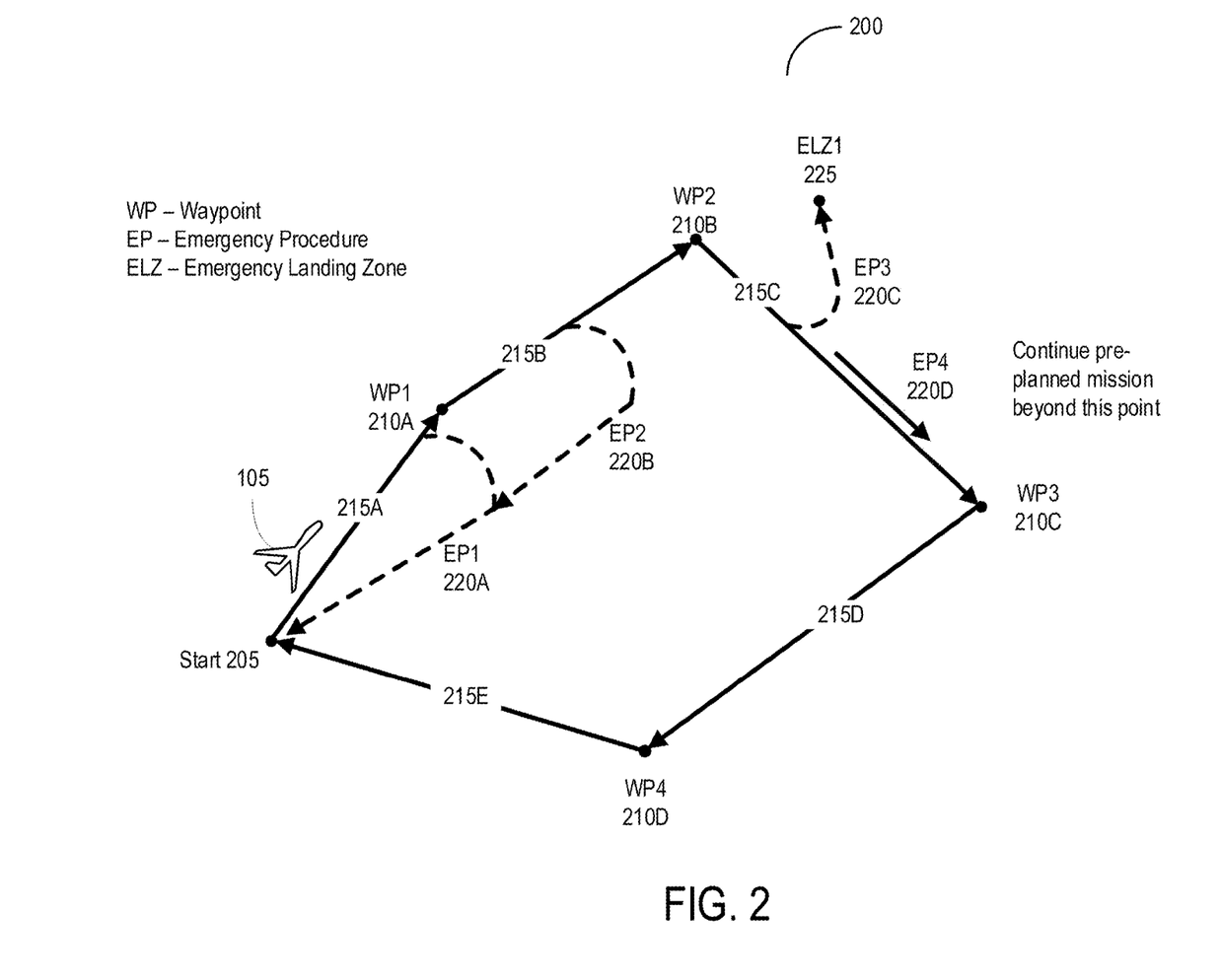
FIG. 2 depicts a block diagram of an example flight plan for a mission in the system for modifying flight paths in accordance with an illustrative embodiment.

Referring now to FIG. 2, depicted is a block diagram of a flight plan 200 for an example mission in the system for modifying flight paths. The flight plan 200 can specify that the air vehicle 105 is to navigate from a start point 205 and back. The flight plan 200 can define four waypoints 210A-D connected via five segments 215A-D. The flight plan 200 can identify multiple contingency measures in the event of an issue with a function of the air vehicle 105 and the risk score rising above the threshold. For the first segment 215A, the flight plan 200 can specify that the air vehicle 105 is to carry out the emergency procedure 220A and return to the start point 205. For the second segment 215B, the flight plan 200 can specify that the air vehicle 105 is to perform the emergency procedure 220B and return to the start point 205. For the third segment 215C, the flight plan 220 can specify that the air vehicle 105 is to perform the emergency procedure 220C to land the air vehicle 105 at an emergency landing zone 225. The flight plan 220 can also specify that the air vehicle 105 is to continue with the pre-planned flight path along the third segment 215C as the emergency procedure 220D beyond the waypoint 210C. The flight plan 220 can define that the emergency procedure 220D can be applicable to the fourth segment 215D and the fifth segment 215E.

Figure 3:
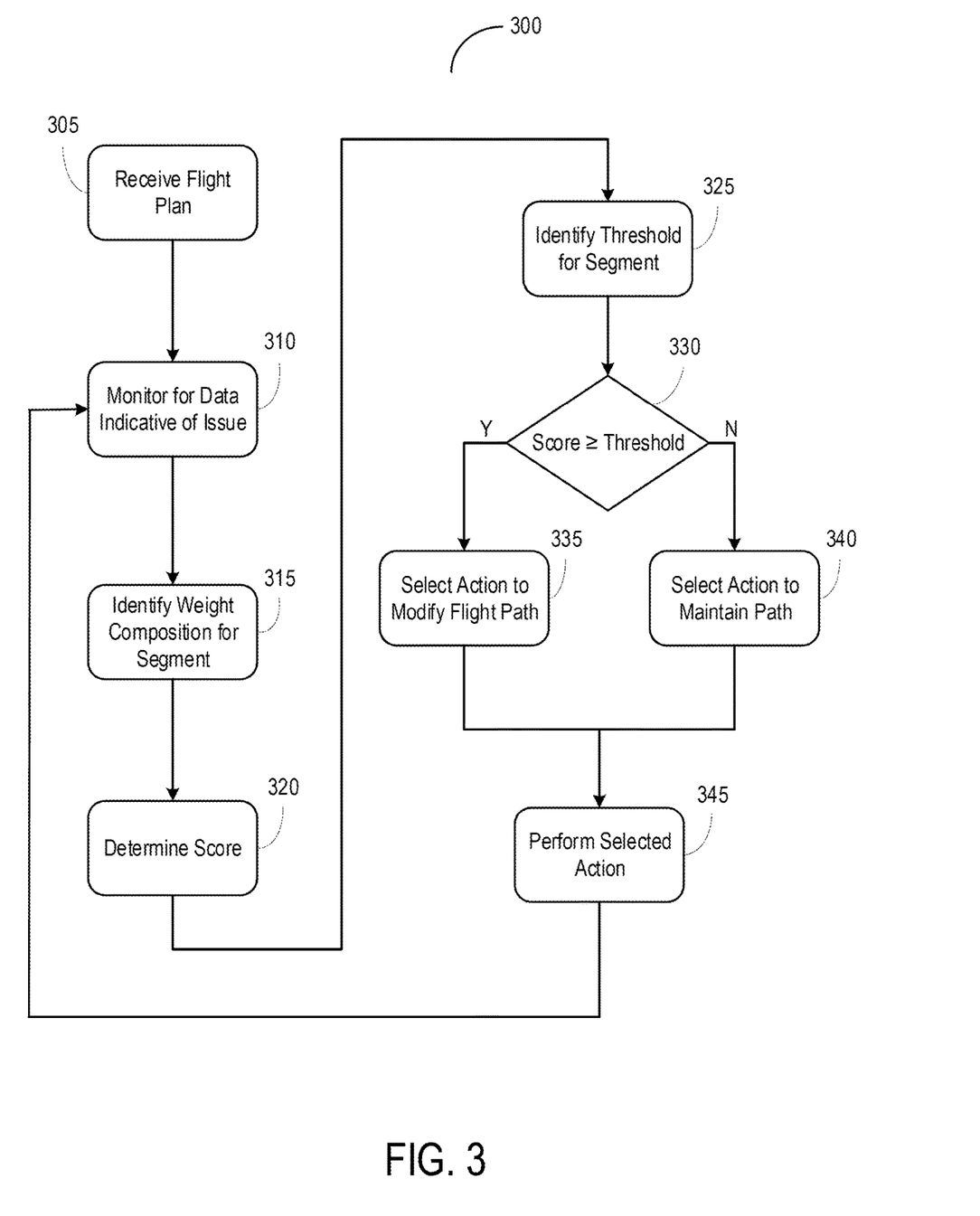
FIG. 3 depicts a flow diagram of an example method of modifying flight paths based on mission specifications in accordance with an illustrative embodiment.

Referring now to FIG. 3, depicted is a flow diagram of a method 300 of modifying flight paths based on mission specifications. The method 300 may be performed by or implemented using any of the components detailed above with respect to FIGS. 1 and 2 or with the components described below in Section B. In overview, a control system can receive a flight plan (305). The control system can monitor for data indicative of an issue (310). The control system can identify a weight composition for a segment (315). The control system can determine a score (320). The control system can identify a threshold for the segment (325). The control system can determine whether the score satisfy the threshold (330). If the score satisfies the threshold, the control system can select the action to modify the flight path (335). Otherwise, if the score does not satisfy the threshold, the control system can select an action to maintain the flight path (340). The control system can perform the selected action (345).

In further detail, a control system (e.g., the control system 110) can receive a flight plan (e.g., the flight plan 150) (305). The flight plan can define various parameters of a mission to be untaken by an air vehicle (e.g., the air vehicle 105) housing the control system 110. The flight plan can define a flight path (e.g., the flight path 170) divided into multiple segments (e.g., segments 175). For each segment, the flight plan can specify a weight composition for calculating a score, one or more thresholds, and one or more actions at which to take upon the score satisfying the corresponding threshold. The action can include modifying the flight path to take a contingent path (e.g., the contingent path 190).

The control system can monitor for data indicative of an issue (310). The control system can receive the data indicative of the issue with one of the functions of the air vehicle from one or more sensors (e.g., the sensors 115). The function can correspond to various components of the air vehicle, such as the structure, engine, rotor, wing, or tail, among others. Using the instrument measurements, the control system can determine whether the data is indicative of the issue with the associated function.

The control system can identify a weight composition for a segment (315). The control system can identify the segment in which the air vehicle is in based on geographic coordinates and the flight path. The weight composition can define a set of weights to contribute to determining the risk score based on the detected issues. The weight composition can be defined to account for the subject of the mission, the type of cargo, the number of passengers, type of air vehicle, terrain characteristics, and instrument measurements, among others. The weight composition for one segment can be configured to be different from the weight composition for another segment.

The control system can determine a score (320). For each detected issue, the control system can identify the weight as specified by the weight composition. The control system can then calculate the overall risk score based on the identified weights. The score can indicate a likelihood of the failure of the mission undertaken by the air vehicle in view of the detected issues with the associated functions. The control system can identify a threshold for the segment (330). The threshold can delineate a value for the score at which the air vehicle is to take contingency actions to account for the issues with various functions on board.

The control system can determine whether the score satisfies the threshold (335). The control system can compare the score with the identified threshold. If the score satisfies the threshold, the control system can select the action to modify the flight path (340). The control system can identify the contingency action to take from the flight plan. Otherwise, if the score does not satisfy the threshold, the control system can select an action to maintain the flight path (345). The control system can perform the selected action (350). The control system can configure various system such as the propulsion and navigation systems in the air vehicle to effectuate the selected action. The control system can also repeat the functionality of (310)-(350) until the end of the flight path or completion of the mission.

Figure 4:
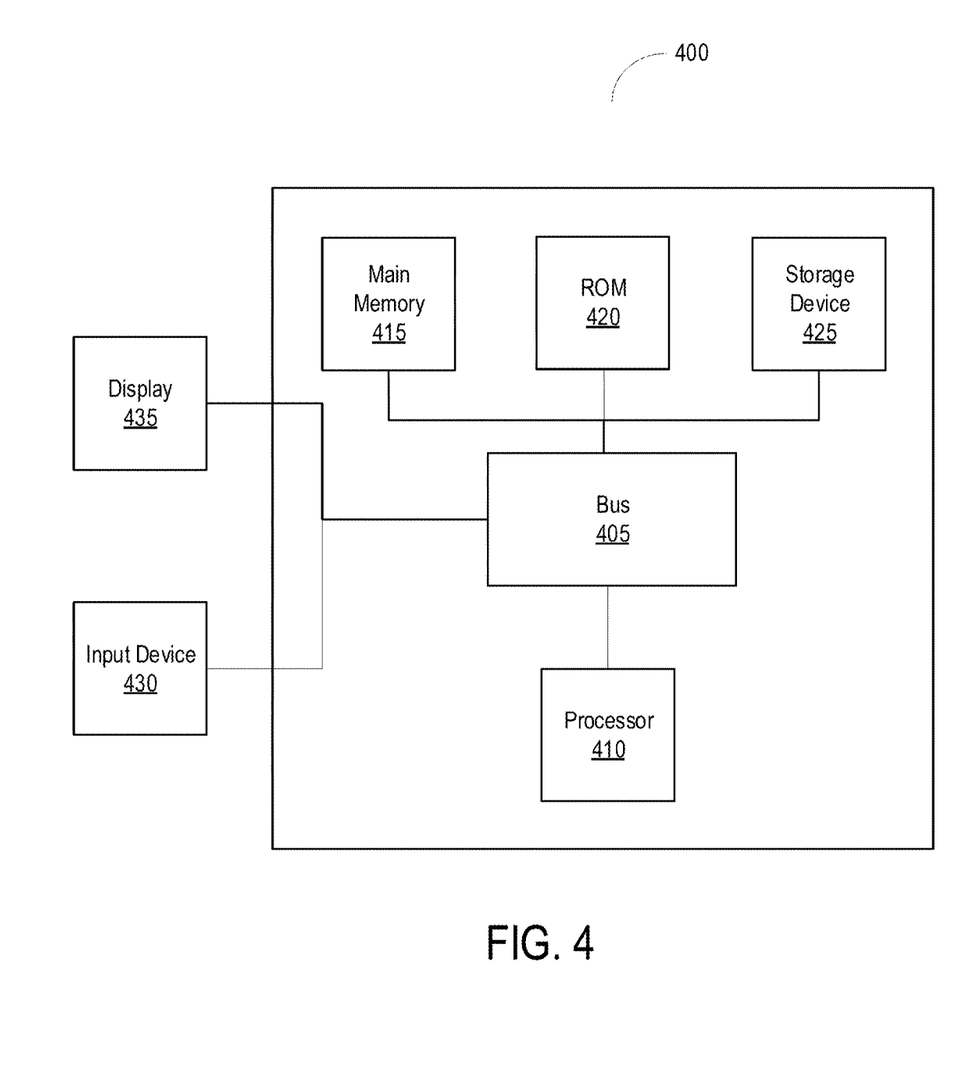
FIG. 4 depicts a block diagram of an example computer system useful in implementing one or more components detailed herein.

Referring now to FIG. 4, depicted is a block diagram of an example computer system 400. The computer system or computing device 400 can include or be used to implement the system 100, or its components such as the control system 110, the sensors 115, the control interface 120, and the remote terminal 165. The computing system 400 includes at least one bus 405 or other communication component for communicating information and at least one processor 410 or processing circuit coupled to the bus 405 for processing information. The computing system 400 can also include one or more processors 410 or processing circuits coupled to the bus for processing information. The computing system 400 also includes at least one main memory 415, such as a random access memory (RAM) or other dynamic storage device, coupled to the bus 405 for storing information, and instructions to be executed by the processor 410. The computing system 400 may further include at least one read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions.

The computing system 400 may be coupled via the bus 405 to a display 435, such as a liquid crystal display, or active matrix display, for displaying information to a user such as an administrator of the data processing system. An input device 430, such as a keyboard or voice interface may be coupled to the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein. The illustrative implementations described in the detailed description, drawings, and claims are not meant to be limiting. Other implementations may be utilized, and other changes may be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

While this specification contains many specific implementation details, these should not be construed as limitations on the scope of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system for mission-based path modifications, comprising:
   one or more processors coupled with memory housed in a vehicle, the one or more processors to:
   maintain, on the memory, a flight plan for a mission to navigate the vehicle through a plurality of segments with a type of cargo according to an objective, the flight plan defining (i) a plurality of weight compositions comprising a first weight composition with which to determine first scores for a first segment of the plurality of segments and a second weight composition with which to determine second scores for a second segment of the plurality of segments and (ii) a plurality of thresholds comprising:
   a first threshold to which to compare the first scores to determine to maintain a state while traveling on the first segment responsive to the first scores being less than the first threshold and perform a first respective action in the first segment responsive to the first scores being greater than the first threshold; and
   a second threshold separate from the first threshold to which to compare the second scores to determine to maintain a state while traveling on the second segment responsive to the second scores being less than the second threshold and perform a second respective action in the second segment responsive to the second scores being greater than the second threshold;
   receive data indicative of an issue with at least one function of the vehicle during the mission on the first segment of the plurality of segments;
   determine a score of the first scores based on the issue with the at least one function, the type of cargo, a classification of the issue of the at least one function, and the objective of the mission, in accordance with the first weight composition of the plurality of weight compositions for the first segment;
   identify an action to perform for the vehicle responsive to the score satisfying the first threshold of the plurality of thresholds for the first segment; and
   navigate, during the first segment or a subsequent segment of the plurality of segments, the vehicle in accordance with the action.

2. The system of claim 1, wherein the one or more processors are further configured to maintain the flight plan for the mission defining identification of the first respective action from a plurality of actions to perform based on a comparison between the score and the first threshold for the first segment of the plurality of segments.

3. The system of claim 1, wherein the one or more processors are further configured to receive the flight plan from a second computing device, the second computing device presenting an interface operable to define the flight plan.

4. The system of claim 1, wherein the flight plan further defines, for each segment: (i) an initial point and a terminal point, (ii) the plurality of weight compositions each of which to determine a respective plurality of weights for a corresponding plurality of issues, and (iii) a plurality of actions to perform in response to satisfaction of the corresponding plurality of thresholds in the plurality of segments.

5. The system of claim 1, wherein the one or more processors are further configured to:
   determine that the score does not satisfy the first threshold for the first segment; and
   identify, in response to determining that the score does not satisfy the first threshold, the action to maintain a flight path of the vehicle along the first segment and the subsequent segment.

6. The system of claim 1, wherein the one or more processors are further configured to:
   determine that the score satisfies the first threshold for the first segment; and
   select, based on the score determined to satisfy the first threshold, the action from a plurality of actions to modify a flight path of the vehicle.

7. The system of claim 1, wherein the one or more processors are further configured to:
   determine that the score satisfies the first threshold for the first segment; and provide, responsive to determining that the score satisfies the first threshold, instructions to present a plurality of actions from which to select for modifying a flight path.

8. The system of claim 1, wherein the one or more processors are further configured to:
determine, in accordance with the first weight composition for the first segment, a combined score based on a plurality of weights, each of the plurality of weights corresponding to a respective issue of the vehicle during the mission; and
navigate the vehicle in accordance with the mission based on a comparison of the combined score with the first threshold for the first segment of the mission.

9. The system of claim 1, wherein the one or more processors are further configured to determine the score based on at least one of: a measurement from an instrumentation of the vehicle, the type of cargo in the vehicle, the objective for the mission, a characteristic of a terrain, a number of occupants in the vehicle, a time elapsed on a flight path, or a vehicle type of the vehicle.

10. The system of claim 1, wherein the one or more processors are further configured to identify, from a plurality of issues, the issue with which to determine the action based on a plurality of priorities for the plurality of issues.

11. A method for mission-based path modifications, comprising:
maintaining, by one or more processors of a vehicle, on memory, a flight plan for a mission to navigate the vehicle through a plurality of segments with a type of cargo according to an objective, the flight plan defining (i) a plurality of weight compositions comprising a first weight composition with which to determine first scores for a first segment of the plurality of segments and a second weight composition with which to determine second scores for a second segment of the plurality of segments and (ii) a plurality of thresholds comprising:
a first threshold to which to compare the first scores to determine to maintain a state while traveling on the first segment responsive to the first scores being less than the first threshold and perform a first respective action in the first segment responsive to the first scores being greater than the first threshold; and
a second threshold separate from the first threshold to which to compare the second scores to determine to maintain a state while traveling on the second segment responsive to the second scores being less than the second threshold and perform a second respective action in the second segment responsive to the second scores being greater than the second threshold;
receiving, by the one or more processors, data indicative of an issue with at least one function of the vehicle during the mission on the first segment of the plurality of segments;
determining, by the one or more processors, a score of the first scores based on the issue with the at least one function, the type of cargo, a classification of the issue of the at least one function, and the objective of the mission, in accordance with the first weight composition of the plurality of weight compositions for the first segment;
identifying, by the one or more processors, an action to perform for the vehicle responsive to the score satisfying the first threshold of the plurality of thresholds for the first segment; and
navigating, by the one or more processors, during the first segment or a subsequent segment of the plurality of segments, the vehicle in accordance with the action.

12. The method of claim 11, further comprising maintaining, by the one or more processors, the flight plan for the mission defining identification of the first respective action from a plurality of actions to perform based on a comparison between the score and the first threshold for the first segment of the plurality of segments.

13. The method of claim 11, further comprising receiving, by the one or more processors, the flight plan from a second computing device, the second computing device presenting an interface operable to define the flight plan.

14. The method of claim 11, wherein the flight plan further defines, for each segment: (i) an initial point and a terminal point, (ii) the plurality of weight compositions each of which to determine a respective plurality of weights for a corresponding plurality of issues, and (iii) a plurality of actions to perform in response to satisfaction of the corresponding plurality of thresholds in the plurality of segments.

15. The method of claim 11, further comprising:
determining, by the one or more processors, that the score does not satisfy the first threshold for the first segment; and
identifying, by the one or more processors, in response to determining that the score does not satisfy the first threshold, the action to maintain a flight path of the vehicle along the first segment and the subsequent segment.

16. The method of claim 11, further comprising:
determining, by the one or more processors, that the score satisfies the first threshold for the first segment; and
selecting, by the one or more processors, based on the score determined to satisfy the first threshold, the action from a plurality of actions to modify a flight path of the vehicle.

17. The method of claim 11, further comprising:
determining, by the one or more processors, that the score satisfies the first threshold for the first segment; and
providing, by the one or more processors, responsive to determining that the score satisfies the first threshold, instructions to present a plurality of actions from which to select for modifying a flight path.

18. The method of claim 11, further comprising:
determining, by the one or more processors, in accordance with the first weight composition for the first segment, a combined score based on a plurality of weights, each of the plurality of weights corresponding to a respective issue of the vehicle during the mission; and
navigating, by the one or more processors, the vehicle in accordance with the mission based on a comparison of the combined score with the first threshold for the first segment of the mission.

19. The method of claim 11, wherein determining the score further comprises determining the score based on at least one of: a measurement from an instrumentation of an air vehicle, the type of cargo in the vehicle, the objective of the mission, a characteristic of a terrain, a number of occupants in the air vehicle, a time elapsed on a flight path, or a vehicle type of the vehicle.

20. The method of claim 11, further comprising identifying the first threshold further comprises identifying, from a plurality of issues, the issue with which to determine the action based on a plurality of priorities for the plurality of issues.

* * * * *